United States Patent [19]

Sakai

[11] Patent Number: 4,484,936
[45] Date of Patent: Nov. 27, 1984

[54] DEGASSING ASSEMBLY

[75] Inventor: Hiromitsu Sakai, Kawanishi, Japan

[73] Assignee: C. Uyemura & Co., Ltd., Osaka, Japan

[21] Appl. No.: 368,745

[22] Filed: Apr. 15, 1982

[30] Foreign Application Priority Data

Apr. 21, 1981 [JP] Japan .............................. 56-56533[U]

[51] Int. Cl.³ ............................................ B01D 19/00
[52] U.S. Cl. ........................................ 55/159; 55/158; 210/436
[58] Field of Search ...................... 55/16, 51, 158, 159, 55/387; 210/188, 436, 472

[56] References Cited

U.S. PATENT DOCUMENTS

| | | | |
|---|---|---|---|
| 2,981,680 | 4/1961 | Binning | 55/16 X |
| 3,238,703 | 3/1966 | Straschil et al. | 55/158 |
| 3,371,468 | 3/1968 | Shropshire | 55/158 |
| 3,523,408 | 8/1970 | Rosenberg | 55/159 |
| 3,631,654 | 1/1972 | Riely et al. | 55/159 |
| 3,657,113 | 4/1972 | Stancell et al. | 55/16 X |
| 3,778,971 | 12/1973 | Granger et al. | 55/159 |
| 3,999,963 | 12/1976 | Ririe, Jr. | 55/51 X |
| 4,004,587 | 1/1977 | Jess | 55/159 X |
| 4,039,305 | 8/1977 | Livesay | 55/159 |
| 4,225,440 | 9/1980 | Pitesky | 210/436 X |
| 4,243,530 | 1/1981 | Lehnhoff et al. | 210/472 X |
| 4,325,715 | 4/1982 | Bowman et al. | 55/158 |
| 4,386,944 | 6/1983 | Kimura | 55/16 |

FOREIGN PATENT DOCUMENTS

| | | | |
|---|---|---|---|
| 459589 | 11/1913 | France | 55/387 |
| 1317331 | 12/1963 | France | 55/158 |
| 1234526 | 6/1971 | United Kingdom | 55/159 |

*Primary Examiner*—Robert Spitzer
*Attorney, Agent, or Firm*—Birch, Stewart, Kolasch & Birch

[57] ABSTRACT

Apparatus removes bubbles from a sample of a liquid solution in order to use the sample for the measurement of concentration and/or a physical property of the solution. The apparatus includes a closed vessel and a porous partition for dividing the interior thereof into first and second compartments. The first compartment has an inlet and an outlet for passage of the bubbly solution. The solution passes through the first compartment while the sample penetrates the porous partition without accompanying bubbles. The second compartment has an outlet for the degassed sample.

3 Claims, 5 Drawing Figures

DEGASSING ASSEMBLY

BACKGROUND OF THE INVENTION

This invention relates to a degassing assembly for removing bubbles from a sample of an electroless plating solution, and more particularly, to a degassing assembly adapted to effectively remove a great volume of hydrogen gas or bubbles from a bubbly sample of an electroless plating solution in order to ensure precise measurement when it is intended to automatically control the concentration and/or the amount of reaction by-products of an electroless plating solution by continuously and automatically measuring the concentration, for example, of a metal ion, and/or the property, for example, specific gravity, conductivity or refractive index of an electroless plating solution.

In analyzing some components in an electroless plating solution, inclusion of bubbles in the solution causes incorrect sampling. If the solution containing bubbles is supplied to an analyzer without degassing, bubbles in the solution disturb the analysis to give rise to a noise. For example, an electroless nickel plating solution is continuously monitored for nickel ion concentration by means of an analyzer such as a spectrophotometer. If an electroless nickel plating solution which contains a great volume of hydrogen gas due to the reaction involved is sampled and introduced into an analyzer without degassing, gas bubbles tend to develop noises, resulting in unacceptable analysis results.

A typical example of the known degassing means for analytical use with plating solutions is shown in FIG. 1. This degassing means comprises a vertical pipe 1 through which liquid flows upwards and a branch pipe 2 connected to the vertical pipe 1 at right angles. Bubbles are mainly entrained with the upward flow of liquid flowing vertically upwards through the vertical pipe 1 while a portion of the liquid entering the branch pipe 2 from which the portion of the liquid is led to an analyzer is more or less free of bubbles. Such a degassing means, however, is not satisfactorily effective for liquids containing a great volume of bubbles, for example, electroless nickel plating solutions, and a considerable volume of bubbles is entrained in the liquid flow through the branch pipe 2 and led to an analyzer. Therefore, the analytical results have considerably unacceptable noises due to the bubbles.

SUMMARY OF THE INVENTION

An object of the present invention is to eliminate the above-mentioned problems, and to provide a degassing assembly which can effectively remove bubbles from a sample of an electroless plating solution containing a great volume of bubbles such as an electroless nickel plating solution, thereby allowing the fully degassed sample liquid to be introduced into an analyzer for the measurement of concentration and/or physical property of the electroless plating solution in order to ensure precise measurement.

According to the present invention, the above-mentioned object is achieved by a degassing assembly for removing bubbles from a sample of an electroless plating solution in order to introduce a degassed sample of the electroless plating solution into an analyzer for the measurement of concentration and/or a physical property of the electroless plating solution comprising a closed vessel, and a porous partition having interconnected pores located within said vessel for dividing the interior thereof into first and second compartments, the first compartment being provided with an inlet and an outlet for the passage of the bubbly sample of the electroless plating solution and the second compartment being provided with an outlet for the degassed sample of the electroless plating solution, and the first and second compartments being in liquid communication with each other through the pores in the porous partition, wherein the bubbly sample passes through the first compartment from the inlet to the outlet while a part of the sample penetrates said porous partition from the first to the second compartment without accompanying bubbles, thereby allowing the degassed sample to flow out of the outlet of the second compartment.

According to the present invention, a porous partition having interconnected pores is located within a closed vessel to divide the interior of the vessel into first and second compartments, the first compartment is provided with an inlet and an outlet for the passage of a bubbly sample of an electroless plating solution, and the second compartment is provided with another outlet for a degassed sample of the electroless plating solution. The bubbly sample is introduced into the first compartment through the inlet and discharged therefrom through the outlet while a part of the sample liquid penetrates the porous partition from the first to the second compartment. During this penetration, the sample liquid containing a great volume of bubbles is effectively degassed so that degassed liquid is available at the outlet of the second compartment, and sent to an analyzer for the concentration or physical property measurement.

The degassing assembly according to the present invention is effectively used for the automatic measurement of the concentration and/or the physical property of electroless plating solutions including electroless nickel plating solutions, electroless cobalt plating solutions, electroless nickel alloy plating solutions and electroless copper plating solutions using as a reducing agent hypophosphite salts or boron compounds such as boron hydride compounds, borazane compounds, etc., electroless copper plating solutions using formalin as a reducing agent, and the like.

The degassing assembly of the present invention may be incorporated into an analyzer system for the automatic continuous analysis of an electroless plating solution. The analyzer system may include a pump for pumping out an electroless plating solution sample from a plating tank, a cooler for cooling the plating solution sample to a predetermined temperature (usually to room temperature), an analyzer for measuring the concentration or the physical property of the plating solution sample, and pipes for connecting the devices. The analyzer may be a spectrophotometer for measuring the absorbance of the plating solution sample, a pH meter, a specific gravity measuring device, an electrical conductivity measuring device, a refractive index measuring device, or the like. The degassing assembly should be provided upstream of the analyzer in order to introduce the degassed sample to the analyzer.

By the term bubbly liquid is meant a liquid containing a substantial volume of gases, for example, hydrogen and air, in the form of bubbles.

BRIEF DESCRIPTION OF THE DRAWINGS

The above and other objects, features and advantages of the present invention will be more fully understood from the following description with reference to the drawings, in which.

DESCRIPTION OF THE PREFERRED EMBODIMENTS

Figure 2:
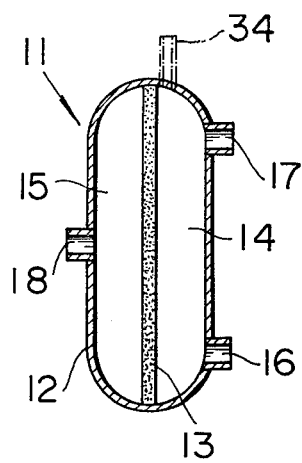
FIG. 2 is a cross-sectional view of a degassing assembly according to one embodiment of the present invention.

Referring to FIG. 2, the degassing assembly according to one embodiment of the present invention is generally depicted at 11 and illustrated as comprising a closed vessel 12 made of any suitable material, for example, glass, metal and plastics. A porous partition 13 having interconnected pores therein is located within the closed vessel 12 to divide the interior of the vessel 12 into first and second compartments 14 and 15 which are in liquid communication with each other through the pores in the partition 13. The first compartment 14 is provided at the lower end with an inlet 16 for introducing bubbly liquid (a sample of an electroless plating solution containing bubbles). This bubbly liquid inlet 16 is preferably opposed to the partition 13 so that the bubbly liquid entering the first compartment 14 through the inlet 16 may impinge against the partition 13. The first compartment 14 is also provided at the upper end with an outlet 17 for the bubbly liquid. Further, the second compartment 15 is provided with another outlet 18 for degassed liquid.

In the operation of this degassing assembly 11, bubbly liquid is introduced into the first compartment 14 through the inlet 16. The majority of the bubbly liquid introduced into the first compartment 14 exits the first compartment 14 through the outlet 17 with bubbles entrained therein. A part of the liquid penetrates the porous partition 13 or passes through the pores in the partition 13 without accompanying bubbles from the first compartment 14 to the second compartment 15. Even if the liquid in the first compartment 14 contains a great volume of bubbles, no bubbles would pass through the pores in the partition 13. It is degassed liquid that enters the second compartment 15 and flows out of the other outlet 18.

The degassing effect is achievable by using as the partition 13 a sintered porous body having a pore of not more than 100 microns, preferably 5 to 100 microns in diameter and a thickness of 1 to 30 mm. Preferably, a thickness of 2 to 20 mm, particularly 5 to 10 mm may be recommended for a ceramic, glass or plastic porous filter, and a thickness of 1 to 10 mm, particularly 2 to 5 mm may be recommended for a metal porous filter such as stainless steel. The flow rate of the liquid flowing out of the outlet 17 may preferably be set higher than that of the liquid flowing out of the other outlet 18 of the second compartment and the stream of the liquid entering the first compartment 14 is directed so as to impinge against the partition 13 in order to promote the degassing effect. The flow rate of the liquid at the inlet 16 may preferably be 0.05 to 10 lit./min., more preferably 0.1 to 5 lit./min.

Figure 3:
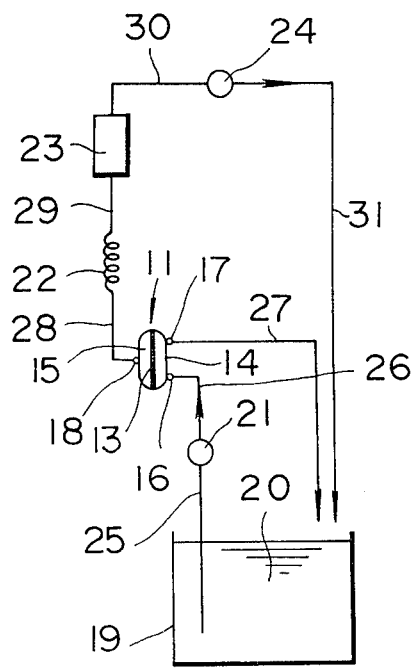
FIG. 3 is a schematic diagram showing an automatic continuous analyzer system for measuring the concentration of an electroless plating solution in which the degassing assembly of FIG. 2 is incorporated.

The degassing assembly 11 may be incorporated in an analyzer system for the automatic continuous analysis of an electroless plating solution, for example, an electroless nickel plating solution, as shown in FIG. 3. More particularly, the analyzer system comprises a measurement line including a plating tank 19 filled with an electroless plating solution 20, a pump 21, the degassing assembly 11, a cooler 22, an analyzer 23 (for example a spectrophotometer) and another pump 24 in series connection with pipes 25, 26, 27, 28, 29, 30 and 31. An electroless plating solution 20 in the plating tank 19 is continuously pumped with the pump 21 through the pipes 25 and 26 into the first compartment 14 of the degassing assembly 11 with bubbles entrained. The majority of this stream (the bubbly sample) is fed back to the plating tank 19 from the outlet 17 through the pipe 27. A part of the sample of the plating solution penetrates the partition 13 from the first compartment 14 to the second compartment 15 while it is degassed. The degassed sample is pumped with the pump 24 from the second compartment 15 through the outlet 18, the pipe 28, the cooler 22 and the pipe 29 to the analyzer 23 where it is monitored for metal ion concentration by measuring the absorbance of the plating solution and then fed back to the plating tank 19 through the pipes 30 and 31.

Figure 1:
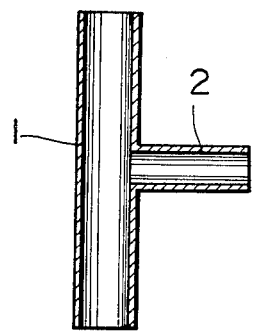
FIG. 1 is a cross-sectional view of a prior art degassing means.

It has been found that the degassing percent is approximately 100% when the degassing assembly 11 as shown in FIG. 2 is used which has the partition 13 in the form of a sintered porous ceramic body having a diameter of 100 mm, a pore size of 60 microns in diameter and a thickness of 7 mm. The flow rate of the liquid at the inlet was 2 lit./min. On the other hand, the degassing percent is in the order of 60–70% in the case of the degassing means shown in FIG. 1. In order to increase the efficiency, the prior art degassing means as shown in FIG. 1 must be increased in size and the time of retention of the sampling flow of the plating solution in the degassing means must be increased so as to prevent the sample of the plating solution from passing the degassing means rapidly without being degassed. Even in such conditions, degassing by the prior art means is not fully effected. Further, the increased retention time of the sampling flow in the degassing means causes an increase of the time required for feeding the sample to the analyzer, resulting in a delay of response. The present invention has succeeded in eliminating such problems and reducing the size of the degassing assembly. The sample of the plating solution is fully degassed within a very short time. Thus analytical results are available within a short response time and a variation in analytical values due to bubbles is effectively prevented.

In FIG. 3, the spectrophotometer may be replaced by other analyzers, for example, a pH meter when the pH (hydrogen ion concentration) of the electroless solution is measured, a specific gravity measuring device, an electrical conductivity measuring device or a refractive index measuring device when the physical property of the electroless plating solution is measured, or the like.

The electroless plating solution may be an electroless nickel plating solution, an electroless cobalt plating solution, an electroless nickel alloy plating solution, an electroless copper plating solution, an electroless gold plating solution, an electroless silver plating solution or the like.

It is to be noted that an additional degassing assembly which may or may not be of the present invention may be inserted in the system of FIG. 3 at a suitable position, for example, between the cooler 22 and the analyzer 23, or upstream of the degassing assembly 11.

Figure 4:
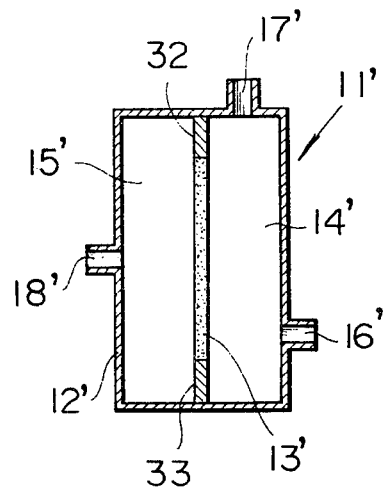
FIGS. 4 and 5 are cross-sectional views of a degassing assembly according to different embodiments of the present invention, respectively.
Figure 5:
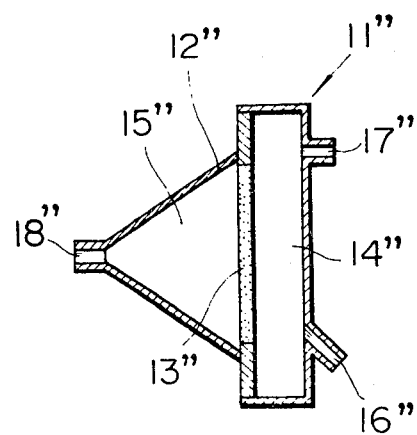

In the practice of the present invention, the configuration of the closed vessel 12 is not limited to that shown in FIG. 2, and modified vessels may equally be used, for example, a rectangular boxlike vessel 12' as shown in FIG. 4 and a vessel 12" consisting of a rectangular box-like housing defining the first compartment 14" and a conical housing defining the second compartment 15" as shown in FIG. 5. Further, it is unnecessary that the partition 13 extends over the entire cross section of the vessel 12 as shown in FIG. 2. For example, the partition 13' may be provided between upper and lower flanges 32, 33 extending from the inner wall of the vessel 12' as shown in FIG. 4. The inlet 16" may be inclined with respect to the partition 13" as shown in FIG. 5. Furthermore, although the outlet 17 of the first compartment 14 is oriented parallel to the inlet 16 as shown in FIG. 2, the outlet 17' may be oriented parallel to the partition 13' as shown in FIG. 4. Although the inlet 16 and outlet 17 may be located at the top and the bottom of the vessel, respectively, the outlet 17 is preferably located at the top to allow bubbles to be carried with the liquid flow. In addition, a vent pipe 34 for the escape of gas may be connected to the top of the first compartment 14 as shown by dot-and-dash lines in FIG. 2.

It is further understood by those skilled in the art that the foregoing description is a preferred embodiment and that various changes and modifications may be made in the invention without departing from the spirit and scope thereof.

What is claimed is:

1. A degassing assembly for removing a degassed sample from a stream of bubbly liquid in order to introduce the degassed sample of the liquid into an analyzer or measuring device for the measurement of concentration and/or a physical property of the liquid, said assembly consisting of:

a closed vessel, and a porous partition having interconnected pores located within said vessel and dividing the interior thereof into first and second compartments, the first compartment having an inlet and an outlet for the passage of the stream of bubbly liquid into and out of said first compartment and the second compartment having an outlet for the degassed sample of the liquid, said first and second compartments being only in liquid communication with each other through the pores in the porous partition, wherein the stream of bubbly liquid passes through the first compartment from the inlet to the outlet thereof while a portion of the liquid penetrates said porous partition from the first to the second compartment without accompanying bubbles, thereby removing from the stream of bubbly liquid the degassed sample which flows out of the outlet of the second compartment.

2. A degassing assembly according to claim 1 wherein the inlet of the first compartment is opposed to said porous partition whereby the bubbly liquid entering the first compartment through said inlet impinges against said porous partition.

3. A degassing assembly according to any one of claims 1 or 2 wherein said porous partition is a sintered porous body having pores of not more than 100 microns in diameter and a thickness of 1 to 30 mm.

* * * * *